(12) United States Patent
Groves et al.

(10) Patent No.: US 6,931,105 B2
(45) Date of Patent: Aug. 16, 2005

(54) CORRELATING CALL DATA AND SPEECH RECOGNITION INFORMATION IN A TELEPHONY APPLICATION

(75) Inventors: Christopher Ryan Groves, Cary, NC (US); Kevin James Muterspaugh, Harvest, AL (US)

(73) Assignee: International Business Machines Corporation, Armonk, NY (US)

( * ) Notice: Subject to any disclaimer, the term of this patent is extended or adjusted under 35 U.S.C. 154(b) by 167 days.

(21) Appl. No.: 10/223,465

(22) Filed: Aug. 19, 2002

(65) Prior Publication Data

US 2004/0032933 A1 Feb. 19, 2004

(51) Int. Cl.⁷ .............................................. H04M 1/64
(52) U.S. Cl. .................. 379/88.03; 704/243; 704/270.1
(58) Field of Search ........................... 379/88.01–88.04; 704/231, 240, 243, 246, 251, 270, 270.1, 275, 253

(56) References Cited

U.S. PATENT DOCUMENTS

| | | | | |
|---|---|---|---|---|
| 5,479,488 A | * | 12/1995 | Lennig et al. | 379/88.04 |
| 5,488,652 A | * | 1/1996 | Bielby et al. | 379/88.03 |
| 5,666,400 A | * | 9/1997 | McAllister et al. | 379/88.01 |
| 5,870,464 A | | 2/1999 | Brewster et al. | 379/219 |
| 5,917,891 A | * | 6/1999 | Will | 379/88.03 |
| 5,995,929 A | * | 11/1999 | Gupta | 704/251 |
| 6,055,513 A | | 4/2000 | Katz et al. | 705/26 |
| 6,061,433 A | | 5/2000 | Polcyn et al. | 379/93.12 |
| 6,122,361 A | * | 9/2000 | Gupta | 379/223 |
| 6,137,863 A | * | 10/2000 | Brown et al. | 379/88.01 |
| 6,188,762 B1 | | 2/2001 | Shooster | 379/265 |
| 6,301,350 B1 | | 10/2001 | Henningson et al. | 379/220.01 |
| 6,314,089 B1 | | 11/2001 | Szlam et al. | 370/270 |
| 6,335,927 B1 | | 1/2002 | Elliott et al. | 370/352 |
| 6,381,324 B1 | | 4/2002 | Shaffer et al. | 379/211.02 |
| 6,400,805 B1 | * | 6/2002 | Brown et al. | 379/88.01 |
| 6,421,672 B1 | * | 7/2002 | McAllister et al. | 707/10 |
| 6,483,896 B1 | * | 11/2002 | Goldberg et al. | 379/88.01 |
| 6,529,871 B1 | * | 3/2003 | Kanevsky et al. | 704/246 |

* cited by examiner

Primary Examiner—Roland G. Foster
(74) Attorney, Agent, or Firm—John Pivnichny; Greenblum & Bernstein

(57) ABSTRACT

A method for improving the recognition confidence of alphanumeric spoken input, suitable for use in a speech recognition telephony application such as a voice response system. An alphanumeric candidate is determined from the spoken input, which may be the best available representation of the spoken input. Recognition confidence is compared with a preestablished threshold. If the recognition confidence exceeds the threshold, the alphanumeric candidate is selected to represent the spoken input. Otherwise, present call data associated with the spoken input is determined. Call data may include automatic number identification (ANI) information, caller-ID information, and/or dialed number information service (DNIS) information. Information associated with the alphanumeric candidate and information associated with the present call data are correlated in order to select alphanumeric information that best represents the spoken input.

7 Claims, 4 Drawing Sheets

CORRELATING CALL DATA AND SPEECH RECOGNITION INFORMATION IN A TELEPHONY APPLICATION

FIELD OF THE INVENTION

The invention relates to the field of telephony applications, and more particularly to the field of telephony applications that employ speech recognition, such as voice response systems.

BACKGROUND

Speech recognition telephony applications such as voice response systems (VRS) often ask a caller to input alphanumeric information. For example, a VRS used by a company's personnel department might ask callers to enter employee identification numbers. Likewise, retail customers might place orders by entering part numbers. One way for a VRS to accept such entries is to use a speech recognition system. Speech recognition is especially helpful to callers who use limited-function terminals such as cellular telephones, because data entry using such terminals is especially awkward.

Unfortunately, speech recognition is an imperfect art, and a speech recognition system is often able to provide only a best estimate of a caller's intended alphanumeric entry. This is increasingly the case when callers use cellular telephones. Cellular telephones are inherently low-fidelity devices, as they use low-bit-rate speech coders in order to minimize the per-call need for radio-frequency spectrum and its associated cost. Further, the call may originate from a location with a high level of background noise, for example from a moving automobile or from a construction site. Background noise and speech-coder distortion cause the performance of the speech recognition system to degrade.

When the performance of the speech recognition system degrades, and it is unable to recognize spoken input with adequate confidence, the VRS may request further information from the caller. For example, the VRS might ask the caller to repeat an entire alphanumeric entry, or to repeat selected characters of the entry. Of course, repetition does not ensure success, and in difficult situations the VRS may go back to the caller numerous times to ask for help. Alternatively, the VRS might present a list of possibilities, from which the caller is instructed to choose his or her intended entry.

Unfortunately, all of these measures to increase speech-recognition confidence are typically very inconvenient for the caller, especially when the caller uses a cellular telephone that has limited display and input capabilities. Thus, there is a need for a way of minimizing requests to the caller when a speech recognition telephony application such as a voice response system is unable to recognize a spoken alphanumeric input with adequate confidence.

SUMMARY

The present invention includes a method for improving the recognition confidence of alphanumeric spoken input, suitable for use in speech-recognition telephony applications such as voice response systems. The method reduces the need to ask callers for additional information when the speech recognition system is unable to recognize spoken alphanumeric input with adequate confidence.

In one embodiment of the invention, the telephony application determines an alphanumeric candidate from spoken input. The alphanumeric candidate may be the speech recognition system's best available representation of the spoken input. Recognition confidence for the alphanumeric candidate is compared with a preestablished threshold. If the recognition confidence exceeds the threshold, the alphanumeric candidate is selected to represent the spoken input. If the recognition confidence does not exceed the threshold, the telephony application determines present call data associated with the spoken input. Call data may include automatic number identification (ANI) information, caller-ID information, dialed number information service (DNIS) information, and the like. Information associated with the alphanumeric candidate and information associated with the present call data are correlated in order to select alphanumeric information that best represents the spoken input.

In a preferred embodiment of the invention, correlation is performed by creating a set of alphanumeric possibilities based on the alphanumeric candidate, determining historical call data associated with each alphanumeric possibility, comparing the present call data with the historical call data associated with each alphanumeric possibility, and representing the spoken input by the alphanumeric possibility whose historical call data best matches the present call data.

In another preferred embodiment, correlation is performed by creating a set of call data possibilities based on the present call data, determining historical alphanumeric data associated with each call data possibility, comparing the alphanumeric candidate with the historical alphanumeric data associated with each call data possibility, and representing the spoken input by selecting the historical alphanumeric data that best matches the alphanumeric candidate.

These and other aspects of the invention will be more fully appreciated when considered in light of the following drawings and detailed description.

DETAILED DESCRIPTION

The present invention includes a method for improving the recognition confidence of alphanumeric spoken input, suitable for use in speech-recognition telephony applications such as voice response systems. The method minimizes the need to ask callers for additional information when the speech recognition system is unable to recognize their spoken input with adequate confidence.

Figure 1:
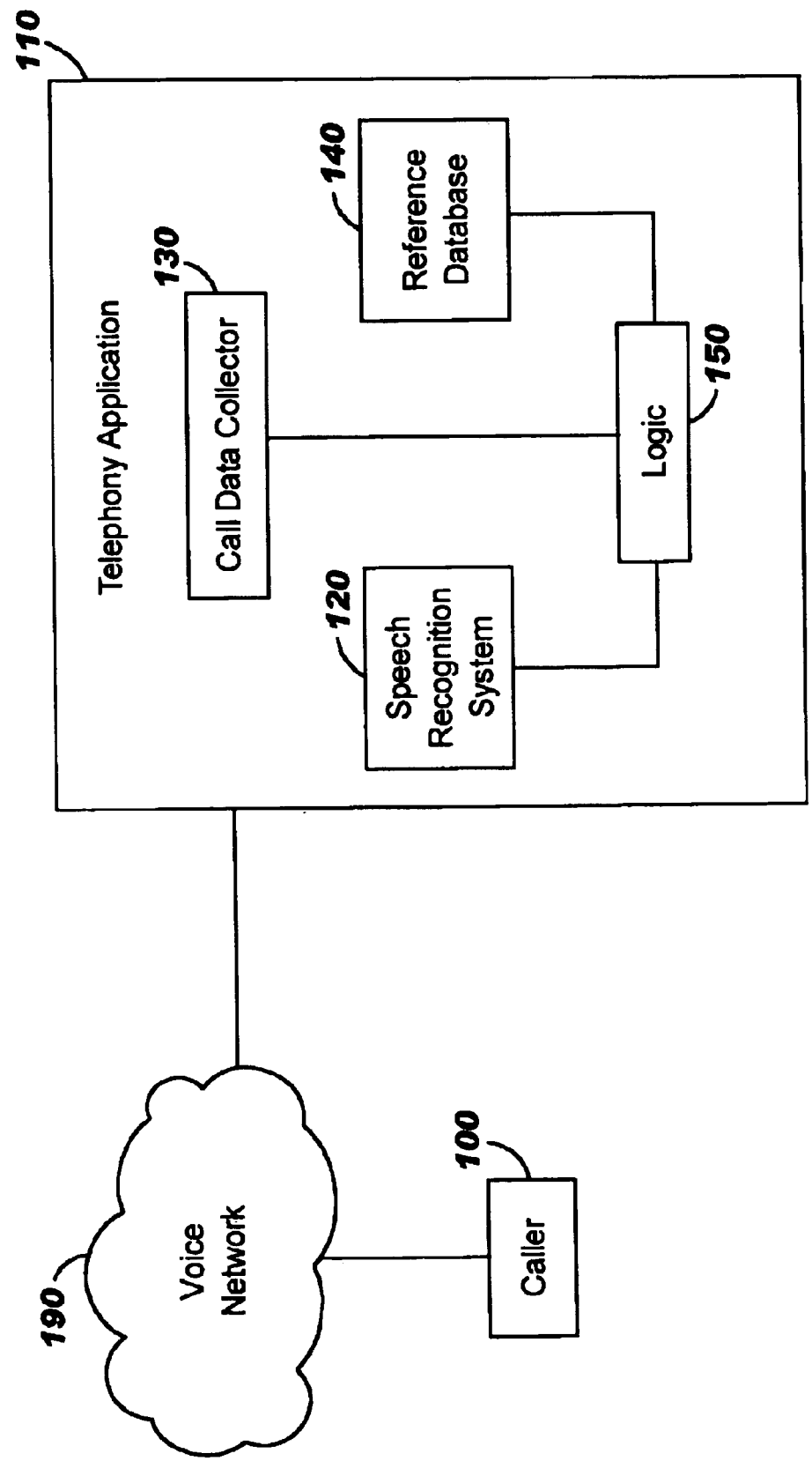
FIG. 1 is a block diagram that includes an exemplary telephony application configured according to the present invention.

FIG. 1 is a block diagram that includes an exemplary telephony application configured according to the present invention. As shown in FIG. 1, a caller 100 communicates with a telephony application 110 using a voice network 190. For convenience, the invention will be described in terms suggesting that the voice network 190 is a conventional telephone network, and that the caller 100 originates a call to the application 110. Neither is a limitation of the invention, however, and the invention applies as well to all kinds of voice communication, including Internet-based voice-over-IP, and to machine-originated calls.

The telephony application 110 includes, or works in association with, a speech recognition system 120. One purpose of the speech recognition system 120 is to accept spoken alphanumeric input from the caller 100, and convert this spoken input into computer usable form. Here, the term alphanumeric refers to the nature of the spoken input, meaning that the caller 100 speaks a combination of letters and numbers, rather than to the details of the computer usable form, which form may be binary, octal, hexadecimal, or any other convenient form.

In general, speech recognition systems compute a level of recognition confidence for each processed utterance. In some speech recognition systems, the level of confidence may be binary, in which case the utterance is recognized or not. In other speech recognition systems, the level of confidence may be probabilistic, based on internal goodness of match, for example indicating that one utterance is recognized with 80% confidence whereas another utterance is recognized with 99% confidence. Thus the speech recognition system 120 may recognize various individual alphanumeric characters with various levels of confidence. When the speech recognition system 120 is of the type that provides a probabilistic indication of confidence for each character, a level of confidence for the entire alphanumeric spoken input may be taken as the sum or product of the individual levels, or as the minimum individual level of the characters, and so forth.

A call-data collector 130 senses and collects call data regarding the spoken input. Call data may include caller-ID information, automatic number identification (ANI) information, dialed number information system (DNIS) information, and so forth. In the case of a voice-over-IP application, the call data may include an Internet address such as an IP address associated with the caller 100 or associated with an Internet Service Provider used by the caller 100, and so forth.

A reference database 140 stores call data in association with previously known alphanumeric entries. For example, an employee having a particular alphanumeric employee number may have a history, however brief, of calling a personnel department's VRS from a known telephone number. The telephone number may have been determined by consulting relatively static personnel records kept for this purpose or for any other purpose, or the telephone number may have been intercepted by the call data collector 130. In either case, the reference database 140 stores the alphanumeric employee number in association with the employee's telephone number. Such call data is referred to here as historical call data; in contrast, call data associated with a presently active spoken input is referred to here as present call data. Newly available present call data may be used to update or overwrite historical call data in the reference database 140.

An advantage of the present invention is that call data need not necessarily be complete. In some situations a telephone number may be truncated by a PBX to a site number. For example, the fictitious telephone number 919-999-1234 may always be received by the call-data collector 130 as 919-999-0000. In other situations, only an extension number may be provided on the private side of a PBX. Thus, for example, the fictitious telephone number 919-999-1234 might be truncated to 9-1234. In a voice-over-IP application, a caller may be associated with a full Internet address, or with a truncated Internet address (for example, only a domain), or by an alias, or by a proxy-server address. The important point is that the reference database 140 stores available call data, be that data complete or incomplete, in association with callers' alphanumeric inputs.

FIG. 1 also shows logic 150. One purpose of this logic is to coordinate the operations of the speech recognition system 120, the call data collector 130, and the reference database 140. It is not important that the logic 150 be stand-alone as shown in the figure. Rather, the logic 150 may be implemented in practice as part of any of the aforementioned components, or implemented by a processor used for other purposes as well as for the telephony application 110. Another purpose of the logic 150 is to correlate information associated with the spoken input and call data information, as will be described shortly.

Figure 2:
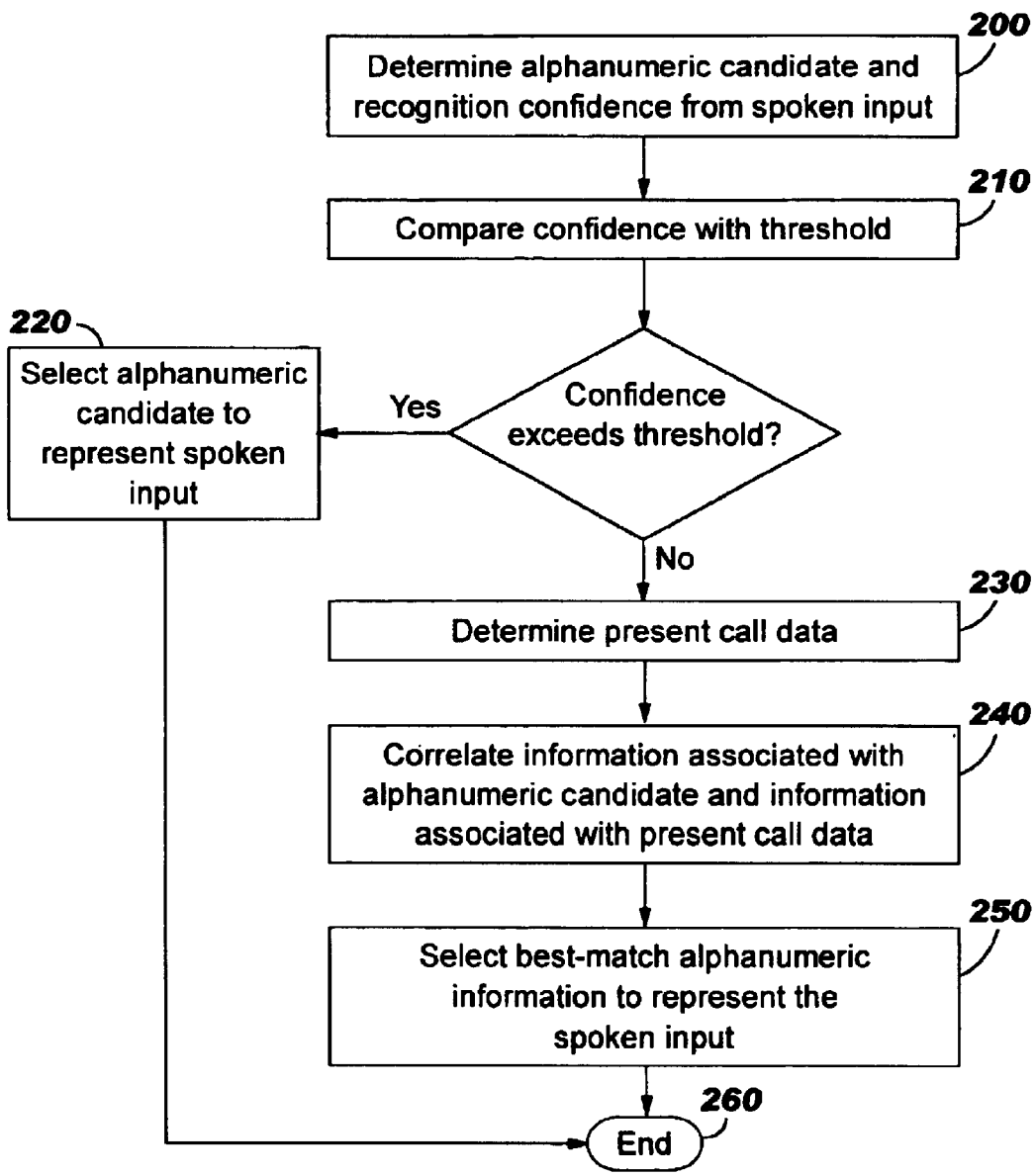
FIG. 2 is a flowchart that shows a method for improving the recognition confidence of alphanumeric spoken input according to the invention.

FIG. 2 shows a method for improving the recognition confidence of alphanumeric spoken input according to the invention. The speech recognition system 120 accepts alphanumeric spoken input from the caller 100, and returns an alphanumeric candidate and confidence information (step 200).

The alphanumeric candidate may include wild-card indicators for characters which the speech recognition system 120 is unable to recognize with acceptable confidence. For example, suppose the caller 100 enters the spoken input 123456, which might be a six-digit employee number, and that the speech recognition system 120 provides binary confidence information. If the speech recognition system 120 properly recognizes all six characters, the alphanumeric candidate is then 123456. If, on the other hand, the speech recognition system 120 fails to recognize one of the characters, for example the character 6, the alphanumeric candidate may be 12345*, where * is the wild-card character.

When the speech recognition system 120 provides probabilistic confidence information, the recognition confidence of each character may be compared with a character-level threshold (for example, 90%), and the recognized character accepted or not accordingly. In the example, if the speech recognition system 120 recognized the characters 1, 2, 3, 4, and 5 with 99% confidence, and recognized the character 6 with 60% confidence, the alphanumeric candidate would again be 12345* with reference to the 90% character-level threshold.

The confidence information is then compared with a predetermined aggregate threshold (step 210). If the speech recognition system 120 provides binary confidence information, the comparison may be logical, based on all the characters of the spoken input being properly recognized or not. If the speech recognition system 120 provides probabilistic confidence information, an aggregate confidence level may be computed, for example by computing the product of the confidence levels of the characters of the spoken input as described above, and compared numerically to an aggregate threshold. In the example above, the aggregate confidence level in the latter case (probabilistic confidence) would be the product of six factors: 0.99 as five factors, and 0.60 as the sixth, or approximately 0.57. If the (aggregate) confidence exceeds the threshold, and an estimate is available for each character, the alphanumeric candidate is accepted, i.e., selected to represent the spoken input (step 220), and the process ends (step 260).

Otherwise (i.e., the confidence level does not exceed the threshold, or an estimate is not available for at least one character), present call data is obtained from the call-data collector 130 (step 230). As mentioned above, the present call data may include caller-ID information, ANI information, DNIS information, Internet addresses, and so forth. The present call data and information associated with the alphanumeric candidate are then correlated (step 240), as explained below in further detail with reference to FIGS. 3 and 4. Based on the results of the correlation, the best-match alphanumeric data is selected to represent the spoken input (step 250), and the process ends (step 260).

Figure 3:
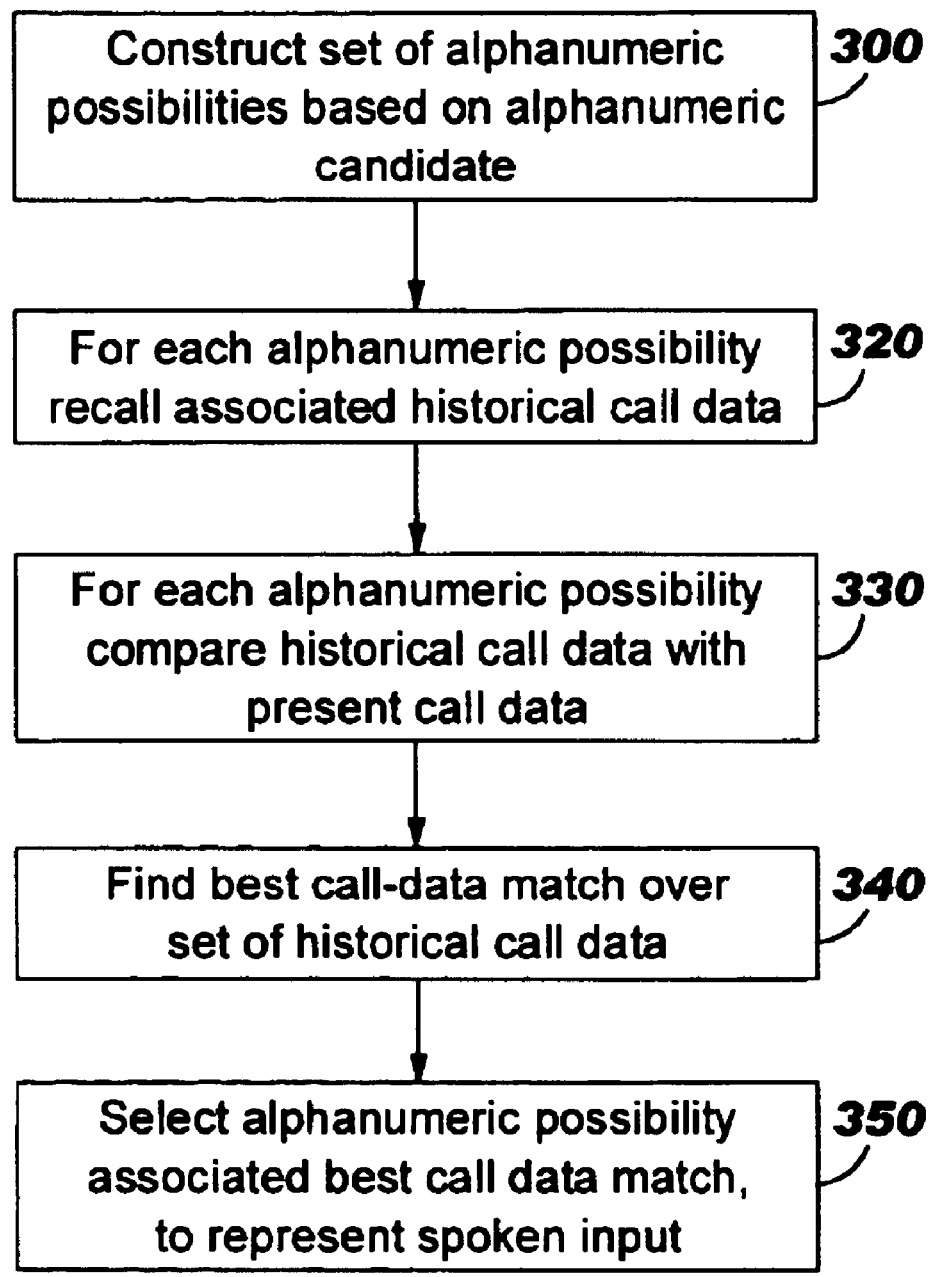
FIG. 3 is a flowchart that shows a correlation method according to an embodiment of the present invention, suitable for use in the method of FIG. 2.

FIG. 3 shows a correlation method according to an embodiment of the present invention, suitable for use in step 240 of the method of FIG. 2. A set of alphanumeric possibilities having a plurality of members is constructed from, and associated with, the alphanumeric candidate (step 300). The construction may be made by including every possibility regarding uncertain characters in the set of alphanumeric possibilities. In the running example introduced above, the alphanumeric candidate is 12345*. Thus, in this example, the set of alphanumeric possibilities would be {123450, 123451, 123452, 123453, 123454, 123455, 123456, 123457, 123458, 123459}. In some situations, the set of alphanumeric possibilities may be refined, based on the probabilistic confidence information. For example, although the intended character 6 might not be recognized with adequate confidence, the speech recognition system 120 might indicate that the last digit is highly unlikely to be 1 or 2; thus, 123451 and 123452 would be eliminated from the set of alphanumeric possibilities.

For each alphanumeric possibility, associated historical call data is recalled from the reference database 140 (step 320). For example, in the reference database 140, caller ID 919-543-1234 might be historically associated with alphanumeric possibility 123455, ANI 3-1111information associated with 123456, and DNIS information 1-800-111-1111 associated with 123457.

The present call data and the historical call data are compared (step 330), and the best match found (step 340). In the running example, suppose the present call data were caller ID 919-543-1111. The best match would be with ANI 3-1111. The alphanumeric possibility associated with the best-match call data is then selected to represent the spoken input (step 350). In the running example, the alphanumeric possibility associated with the best match call data would be 123456.

Figure 4:
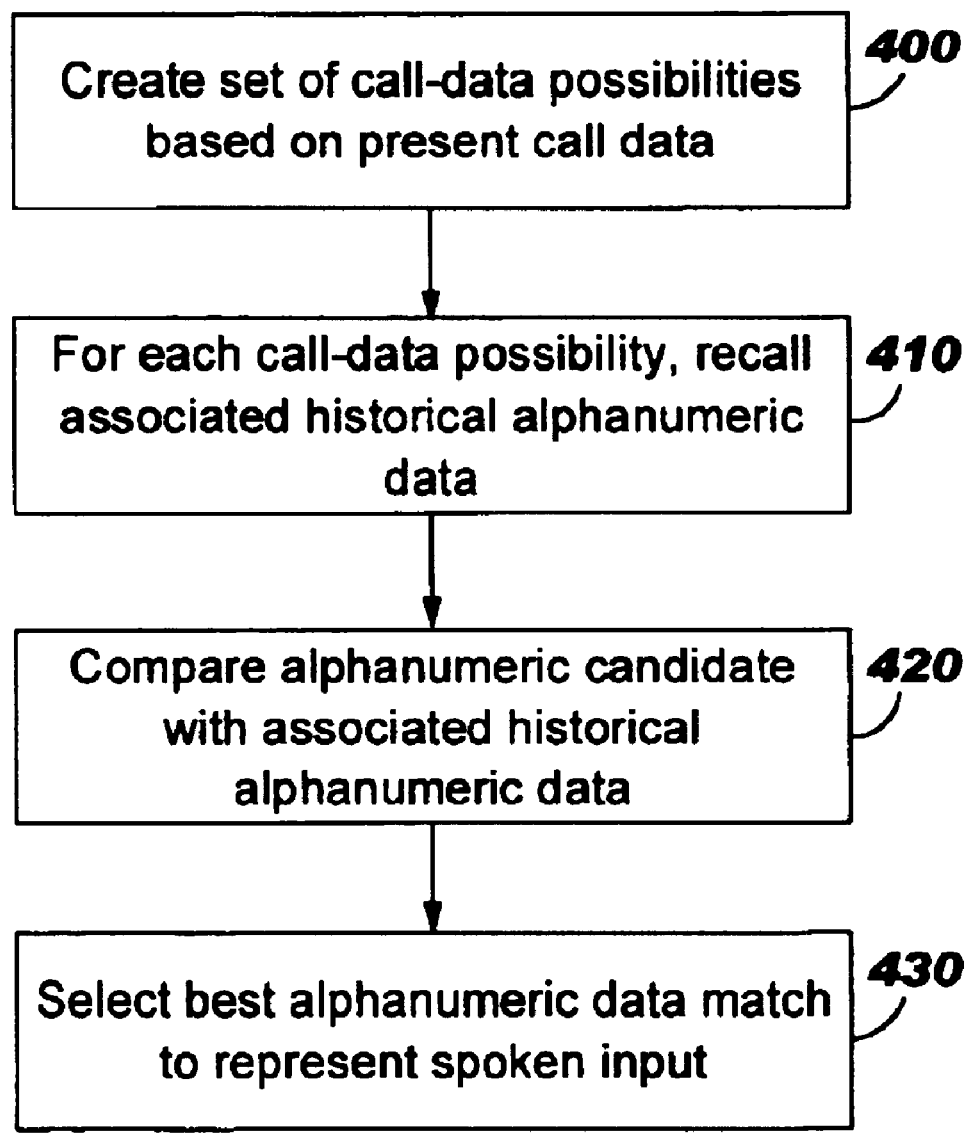
FIG. 4 is a flowchart that shows a correlation method according another embodiment of the present invention, suitable for use in the method of FIG. 2.

FIG. 4 shows another correlation method according another embodiment of the present invention, suitable for use in step 240 of the method of FIG. 2. This may be thought of as the logical complement of the method just described with respect to FIG. 3. In the method of FIG. 4, the reference database 140 is indexed and accessed by call-data information rather than by alphanumeric information. A set of call-data possibilities having a plurality of members is constructed from, and associated with, the present call data (step 400). The construction may be made by including every possibility regarding unspecified characters in the set of call-data possibilities, for example by including wild-card characters to pad telephone numbers to thirteen digits to account for country codes, and eliminating any members of the set not included in the reference database 140 or known to be highly unlikely.

For each remaining member of the set of call-data possibilities, associated historical alphanumeric data is recalled from the reference database (step 410), and compared with the alphanumeric candidate (420). The associated historical alphanumeric data that best matches the alphanumeric candidate is selected to represent the spoken input (step 430).

From the preceding description, those skilled in the art will now appreciate that the present invention provides a way of increasing the recognition confidence of spoken alphanumeric information, thereby benefitting those who use speech recognition telephony applications. The foregoing description is illustrative rather than limiting, however, and the invention is limited only by the claims that follow.

We claim:

1. A method for improving the recognition confidence of alphanumeric spoken input, suitable for use in a telephony application, said method comprising the steps of:

determining an alphanumeric candidate from spoken input;

determining present call data associated with a source of the spoken input;

constructing a plurality of alphanumeric possibilities based on the alphanumeric candidate;

recalling historical call data associated with each alphanumeric possibility;

comparing the present call data with the historical call data associated with each alphanumeric possibility; and selecting the alphanumeric possibility whose historical call data best matches the present call data, to represent the spoken input.

2. The method of claim 1, wherein the present call data includes automatic number identification information.

3. The method of claim 1, wherein the present call data includes caller-ID information.

4. The method of claim 1, wherein the present call data includes dialed number information service information.

5. The method of claim 1, wherein the present call data includes dialed number information service information and automatic number identification information.

6. The method of claim 1, wherein the present call data includes dialed number information service information and caller-ID information.

7. The method of claim 1, wherein the present call data includes an Internet address.

* * * * *